(12) United States Patent
Richards et al.

(10) Patent No.: US 12,126,788 B2
(45) Date of Patent: Oct. 22, 2024

(54) METHOD AND APPARATUS FOR USE IN A TIME-OF-FLIGHT IMAGING SYSTEM

(71) Applicant: CAMBRIDGE MECHATRONICS LIMITED, Cambridge (GB)

(72) Inventors: David Richards, Cambridge (GB); Joshua Carr, Cambridge (GB)

(73) Assignee: CAMBRIDGE MECHATRONICS LIMITED, Cambridge (GB)

(*) Notice: Subject to any disclaimer, the term of this patent is extended or adjusted under 35 U.S.C. 154(b) by 235 days.

(21) Appl. No.: 17/624,644

(22) PCT Filed: Jul. 27, 2020

(86) PCT No.: PCT/GB2020/051802
§ 371 (c)(1),
(2) Date: Jan. 4, 2022

(87) PCT Pub. No.: WO2021/019230
PCT Pub. Date: Feb. 4, 2021

(65) Prior Publication Data
US 2022/0264074 A1   Aug. 18, 2022

(30) Foreign Application Priority Data
Jul. 26, 2019   (GB) .................................... 1910759

(51) Int. Cl.
*H04N 13/254*   (2018.01)
*G01S 7/481*   (2006.01)
*G01S 17/894*   (2020.01)

(52) U.S. Cl.
CPC ......... *H04N 13/254* (2018.05); *G01S 7/4814* (2013.01); *G01S 17/894* (2020.01)

(58) Field of Classification Search
CPC ... H04N 13/254; G01S 7/4814; G01S 17/894; G01S 17/42; G01S 17/89; G01S 7/481; H04M 1/0264
See application file for complete search history.

(56) References Cited

U.S. PATENT DOCUMENTS 10,203,399 B2 *   2/2019   Retterath .............. G01S 7/4863
10,488,497 B2 *   11/2019   Cheong .................. G01S 17/89
(Continued)

FOREIGN PATENT DOCUMENTS

| EP | 2 728 306 | 5/2014 |
| EP | 3 318 894 | 5/2018 |
| WO | WO 2018096347 | 5/2018 |

OTHER PUBLICATIONS

GB Examination Report dated Oct. 30, 2023 of GB Application 2202528.2, pp. 4.
(Continued)

*Primary Examiner* — Fernando Alcon
(74) *Attorney, Agent, or Firm* — Haley Guiliano LLP

(57) ABSTRACT

A method suitable for use by a time-of-flight (TOF) imaging system (500), wherein the system emits illumination in multiple configurations, each configuration having a different spatially-varying intensity over a field of view of an image sensor (512), the method comprising: moving an actuation mechanism (506) to change the illumination via a first sequence of configurations from a first configuration (A) to a final configuration (B); moving the actuation mechanism (506) to subsequently change the illumination via a second sequence of configurations from the final configuration to the first configuration or a second configuration; and obtaining a set of data from the image sensor (512) for each of the configurations (A, B) in the first and second sequences, thereby obtaining two sets of data for each configuration that are suitable for producing two depth
(Continued)

image frames, wherein the two sets of data corresponding to the final configuration are consecutively obtained from the first and second sequences. Light emitted by light source (502) passes through a set of one or more optical elements (504) before being emitted from the TOF system (500). The set of optical elements (504) includes a diffractive optical element to produce an optical field, and also includes a shift lens to which the actuation mechanism (506) is operatively connected. Translational movement of the shift lens in directions perpendicular to the optical axis result in steering of the light. The imaging part includes a receiver lens and/or filter system (510) and an image a multipixel sensor (512). The TOF system (500) also includes a controller (500).

26 Claims, 7 Drawing Sheets

(56) References Cited

U.S. PATENT DOCUMENTS

| | | | | |
|---|---|---|---|---|
| 2011/0299059 | A1* | 12/2011 | Buettgen | G01S 7/4815 |
| | | | | 315/250 |
| 2012/0038903 | A1* | 2/2012 | Weimer | G01C 3/08 |
| | | | | 250/208.2 |
| 2012/0176476 | A1* | 7/2012 | Schmidt | G01S 17/894 |
| | | | | 348/46 |
| 2013/0070132 | A1* | 3/2013 | Lehmann | H04N 25/772 |
| | | | | 348/294 |
| 2015/0135703 | A1* | 5/2015 | Eddington | G02B 27/646 |
| | | | | 60/528 |
| 2015/0163474 | A1* | 6/2015 | You | G01B 11/2513 |
| | | | | 348/46 |
| 2015/0260830 | A1* | 9/2015 | Ghosh | G01S 7/484 |
| | | | | 250/208.1 |
| 2017/0146640 | A1* | 5/2017 | Hall | G01S 7/4813 |
| 2017/0221212 | A1* | 8/2017 | Adam | G01S 17/50 |
| 2017/0234985 | A1* | 8/2017 | Kadambi | G01S 17/894 |
| | | | | 702/152 |
| 2018/0260967 | A1* | 9/2018 | Bleyer | G06T 7/557 |
| 2019/0018137 | A1* | 1/2019 | Akkaya | G01S 7/4915 |
| 2019/0086521 | A1* | 3/2019 | Boutaud | G01S 17/894 |
| 2019/0107623 | A1* | 4/2019 | Campbell | G01S 17/931 |
| 2020/0300977 | A1* | 9/2020 | Rowlands | G01S 7/486 |
| 2020/0309955 | A1* | 10/2020 | Laflaquière | G01S 17/10 |

OTHER PUBLICATIONS

GB Search Report and Examination Report dated Jun. 17, 2020 of GB Application 1910759.8.
International Search Report and Written Opinion of PCT/GB2020/051802 dated Oct. 13, 2020.

* cited by examiner

METHOD AND APPARATUS FOR USE IN A TIME-OF-FLIGHT IMAGING SYSTEM

CROSS-REFERENCE TO RELATED APPLICATIONS

This application is a national stage application under 35 U.S.C. § 371 of International Application PCT/GB2020/051802, filed Jul. 27, 2020, which claims priority of GB Patent Application 1910759.8, filed Jul. 26, 2019. The disclosure of which are hereby incorporated by reference herein in their entireties.

FIELD

The present application relates, amongst other things, to a method suitable for use by a time-of-flight imaging system, particularly wherein the system emits illumination in multiple configurations with each configuration having a different spatially-varying intensity over a field of view of an image sensor.

BACKGROUND

Three-dimensional (3D) sensing systems (also known as range imaging systems) typically produce a two-dimensional (2D) image (known as a range image) with each pixel value corresponding to the distance to a point (or region) in a scene. The distances (also known as depths) can be measured in various ways, notably using structured light techniques or time-of-flight (TOF) techniques. TOF techniques are similar to radar in that a range image (or depth image) similar to a radar image is produced except that a light pulse is used instead of an RF pulse. Typically, TOF is scanner-less, that is to say that the entire scene is captured with a single light pulse. Relatively small and relatively high performance (range and resolution) 3D sensing systems suitable for use in portable electronic devices such as mobile telephones are of interest.

SUMMARY

According to a first aspect of the present invention, there is provided a method suitable for use by a time-of-flight (TOF) imaging system, wherein the system emits illumination in multiple configurations, each configuration having a different spatially-varying intensity over a field of view of an image sensor, the method comprising:
  moving an actuation mechanism to change the illumination via a first sequence of configurations from a first configuration to a final configuration;
  moving the actuation mechanism to subsequently change the illumination via a second sequence of configurations from the final configuration to the first configuration or a second configuration; and
  obtaining a set of data from the image sensor for each of the configurations in the first and second sequences, thereby obtaining two sets of data for each configuration that are suitable for producing two depth (or range) image frames, wherein the two sets of data corresponding to the final configuration are consecutively obtained from the first and second sequences.

For example, if the first and second sequences each comprises a first configuration and a final configuration with no other configurations in the sequence, the two image frames may be attained, sequentially, by obtaining the data from 1) the first configuration, 2) the second configuration, 3) the second configuration and 4) the first configuration. As such, two data sets for the final configuration are consecutively captured between the first and second sequences. Moreover, the two sets of data are suitable for producing two depth image frames in the sense that each of the configurations have been visited at least once, while, in practice, multiple sets of data may be used in any suitable way to produce multiple depth image frames.

The second configuration may be a configuration different to the final configuration. That is, the last configuration in the second sequence does not necessarily to be the final configuration. For example, the first sequence and the second sequence may not comprise the same set of configurations.

The phrase "consecutively" does not necessity mean the two data sets of the final configurations are continuously obtained. There may be a temporal break between obtaining the two data sets. Either way, the data set of the final configuration in the second sequence may be obtained following the data set of the final configuration in the first sequence is obtained.

Preferably, the two sets of data consecutively obtained for the final configuration, are obtained without moving the actuation mechanism. Even though the obtaining of the two sets of data corresponding to the final configuration is specified to be consecutive, there may be a time gap between obtaining these two sets of data.

Thus, the illumination can be changed between different configurations that enable greater intensities to be produced (thereby improving performance), while the frequency with which the actuation mechanism is moved can be reduced. Advantageously, such as arrangement may reduce the time required for attaining the two image frames due to the omission of movement in between the first and the second sequence. For example, if the first and second sequences each consists of only the first configuration and the second configuration, removing actuator movement between the first and second sequence (as well as the second sequence and first sequence), the time accounted for actuator movement in repeated cycles may be reduced by half. Furthermore, when an SMA actuator is used, a pause in actuator movement between sequences may advantageously allow the SMA wires to cool more effectively. This is compared, for example, with a prior method in which a sequence is simply repeated.

Optionally, the integrated intensity of the illumination during the first sequence is substantially the same as that during the second sequence. Preferably, the configurations in each of the first and second sequence may have substantially the same integrated intensity. Alternatively, the integrated intensity may be different from one configuration to another in a sequence, e.g. to cater for different projected surfaces. Either way, the integrated intensity of illumination for any one configuration in the first sequence may be identical to the corresponding configuration in the second sequence.

Optionally, the second sequence corresponds to the first sequence in reverse order. For example, in some embodiments, the first sequence may be in the order of first configuration, an intermediate configuration, and a final configuration. Thus, the corresponding second sequence may be in the order of the final configuration, the intermediate configuration and the first configuration.

Optionally, each of the first and second sequences includes only the first configuration and the final configuration. Thus, in such embodiments, the actuation mechanism may only offer two-stage movement to move the illumination between two positions.

Alternatively, the first and second sequences each comprises one or more further configurations in between the first and final configuration in the respective sequence. For example, the first sequence may be in the order of first configuration, an intermediate configuration, and a final configuration, and the second sequence may be in the order of the final configuration, the intermediate configuration and the first configuration.

Optionally, the intensity integrated over each sequence is substantially uniform throughout substantially all of the field of view of the image sensor. More specifically, the illumination may be a pattern moveable across, and within or extends beyond the bound of, the field of view by the actuation mechanism.

Optionally, for each sequence, the illumination in each configuration of the sequence is substantially non-overlapping with the illumination in any of the other configurations in the sequence. For each sequence, a portion of the illumination in each configuration of the sequence may overlap with the illumination in one or more of the other configurations. For example, the illumination over two consecutive configurations in any given sequence may overlap up to 50% of, less than 20% of, less than 10% of the illuminated area in the configuration.

Optionally, each sequence includes at least one configuration in which the illumination is substantially non-uniform over at least a portion of the field of view of the camera. For example, the illumination may be focussed, or partially focussed to form a projected pattern or a dot projection commonly referred to as spot illumination.

Optionally, each sequence includes at least one configuration in which the illumination is substantially uniform throughout substantially all of the field of view of the camera. Typically, such configuration may be achieved by defocusing the illumination on the projected surface. Such illumination may be referred to as flood illumination.

Optionally, the method comprises moving the actuation mechanism to focus and de-focus the illumination, so as to switch between uniform (flood) illumination and non-uniform (spot) illumination. Typically, this may be achieved by moving a lens or light emitter along its optical axis.

Optionally, the field of view of the image sensor corresponds to the field of view of the image sensor together with one or more optical elements associated with the image sensor. However, the field of view of the emitter (or the projected area by the emitter) does not necessarily equal to that of the image sensor. For example, the illumination from the emitter may be projected beyond, or within, the boundary of the field of view of the image sensor. The optical elements may comprise one or more of: a lens element such as a microarray lens, a lens, a prism, a mirror, or a diffraction grating.

Optionally, the method is carried out in a series of subframes, wherein a set of data is obtained and then the actuation mechanism is moved during each subframe except for the final subframe associated with each sequence. More specifically, each subframe corresponds to a configuration of the sequence.

Optionally, the actuation mechanism is moved within a first part of each subframe in which it is moved and the data is obtained within a second part of each subframe.

Optionally, in each final subframe, the data is obtained within substantially all of the subframe. That is, the final subframe may be shorter than, or the same as, the other subframes in the sequence.

Optionally, the subframes have a frequency of between 10 and 50 Hertz (e.g. ~30 Hertz) or between 40 and 80 Hertz (e.g. ~60 Hertz) or between 100 and 140 Hertz (e.g. ~120 Hertz). Optionally, the actuation mechanism is moved with a frequency of between 5 and 25 Hertz (e.g. ~15 Hertz) or between 20 and 40 Hertz (e.g. ~30 Hertz) or between 50 and 70 Hertz (e.g. ~60 Hertz). This may be exceptional to the final subframe. Such a low frequency range may be applicable in systems where the actuator mechanism only moves the illumination between a limited number of configurations, e.g. 2 configurations in a sequence such as A-B . . . B-A. In such systems, the depth image frame may be obtained at 30 Hertz and actuation mechanism frequency at 60 Hertz, with a first sequence and a final sequence each having two configurations (A-B and B-A). In general, the ratio of the actuation mechanism frequency to the subframe frequency may be $(N-1)/N$, where N is the number of configurations.

In systems featuring a higher number of configurations in a sequence, e.g. 4 configurations (A-B-C-D or D-C-B-A) in a sequence as featured in a typical dot scanning system, the corresponding subframes may adapt a higher frequency of 120 Hertz, in order to maintain a frame rate of 30 fps when obtaining depth image. Conversely, the subframes may operate at a frequency of 60 Hertz which results in a reduced depth image frame rate of 15 fps.

Depending on the limit of the actuator mechanism, the subframe frequency may further increase to accommodate more configurations in a sequence. For example, the subframe frequency may further increase to 480 Hertz for a dot scanning system featuring 16 configurations in a sequence, which may produce depth images at a frame rate of 30 fps.

Optionally, each first part has a first duration and each second part has a second duration that is longer than the first duration. Alternatively, each first part has a first duration and each second part has a second duration that is shorter than the first duration. Optionally, the first duration is less than 10 milliseconds.

Optionally, the actuation mechanism comprises one or more shape-memory alloy actuators that are resistively heated to provide the movement.

Optionally, the one or more shape-memory alloy actuators are resistively heated within each first part and cool within each second part such that an average temperature of the wires does not substantially increase between successive subframes. Optionally, the temperature of the wires reduces during the final subframe.

Optionally, the sets of data obtained for each configuration include a set of data for the first configuration that is obtained without moving the actuation mechanism therebefore. For example, once the second sequence is complete and the data set for the first configuration has been obtained, a new first sequence may start without moving the actuation mechanism, e.g. another data set for the first configuration in a new first sequence may consecutively obtained after obtaining the data set for the first configuration in a previous second sequence.

Optionally, the change in illumination each comprises moving the illumination in a scanning pattern across the field of view. In other words, the first and second sequences may comprise moving the spot illumination in a plurality of discrete movements, or one or more continuous movements, or a combination of both. Subsequent cycles of the scanning pattern may then use the same cycle as previously used, or may use different cycles. For example, different cycles may allow scanning at different points in each of the cycles (e.g. different areas of interest), or the scanning the same points in different order (e.g. different scanning paths). The non-uniform illumination may move in discrete positions across at least part of the field of view, or may move continuously across at least part of the field of view. This is because in some embodiments, time-of-flight measurement techniques rely only on illumination intensity over a period, and there is no need for the moving illumination to come to rest in order for the data set to be obtained.

Optionally, the scanning pattern comprises moving the illumination in at least two non-parallel directions across the field of view in each of the first and second sequence. For example, the scanning pattern may comprise, in a configuration, moving the illumination along a first direction across at least part of the field of view. The scanning pattern may further comprise, in a further configuration, moving the illumination along a second direction across at least part of the field of view. The first direction may be perpendicular to the second direction, or angled to the second direction in a plane. That is, the first direction may be angled at a non-zero angle to the second direction. The scanning pattern may be a raster scanning pattern. The scanning pattern may be boustrophedonic. Increasing the number of (scanning) points in the scanning pattern may result in a more uniformly illuminated field of view, which may allow improved resolution across the whole field of view. However, the more points in the scanning pattern, the more data set which need to be obtained and combined in order to generate the output image frame. Thus, the scanning pattern may be chosen to suit the application.

Optionally, the illumination comprises a light beam having a beam projection configured to tessellate, a light beam having a circular or polygonal beam projection, a pattern of parallel stripes of light, or a pattern of dots or circles of light. It will be understood that these are merely example types of illumination and are non-limiting. By tessellate, it is meant that the beam shape is configured to substantially cover the field of view when moving the spot illumination without the beam shape substantially overlapping. This may be without gaps between the projections, or there may be gaps between projections.

Optionally, the method comprises plural scanning cycles, wherein each of the plural scanning cycles having substantially the same first configuration and final configuration with the same, or different, first and second sequences of configurations. More specifically, the plural scanning cycles may have substantially the same first configuration and final configuration with different scanning patterns.

Optionally, the second sequence is from the final configuration to the second configuration and the method further comprises: moving the actuation mechanism to subsequently change the illumination via a third sequence of configurations from the second configuration to the final configuration or to a third configuration; and obtaining a set of data from the image sensor for each of the configurations in the third sequence, wherein the two sets of data corresponding to the second configuration are obtained without moving the actuation mechanism.

Optionally, the third sequence is from the second configuration to the third configuration and the method further comprises: moving the actuation mechanism to subsequently change the illumination via a fourth sequence of configurations from the third configuration to the final configuration; and obtaining a set of data from the image sensor for each of the configurations in the fourth sequence, wherein the two sets of data corresponding to the third configuration are obtained without moving the actuation mechanism.

There may be provided a non-transitory data carrier carrying code for causing a time-of-flight imaging system to perform the method.

There may be provided apparatus for use in a time-of-flight imaging system, the apparatus configured to perform the method.

Optionally, the apparatus comprises:
an illuminating part for emitting the illumination;
the actuation mechanism, wherein the actuation mechanism is comprised in, or operatively connected to, the illuminating part; and
an imaging part comprising the image sensor;
at least one controller operatively connected to at least the actuation mechanism and the imaging part and configured to perform the method.

Optionally, the actuation mechanism comprises one or more shape-memory alloy (SMA) components. These may be SMA wires.

BRIEF DESCRIPTION OF THE DRAWINGS

Certain embodiments of the present invention will now be described, by way of example only, with reference to the accompanying drawings, in which.

DETAILED DESCRIPTION

Figure 1A:
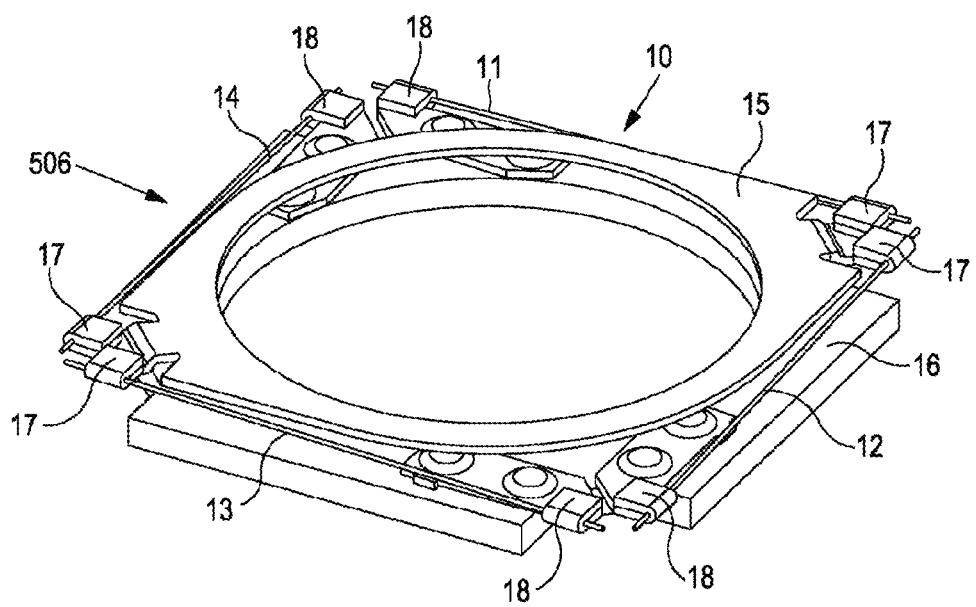
FIG. 1A is a perspective view of an SMA actuator of a first embodiment according is to the present invention.
Figure 1B:
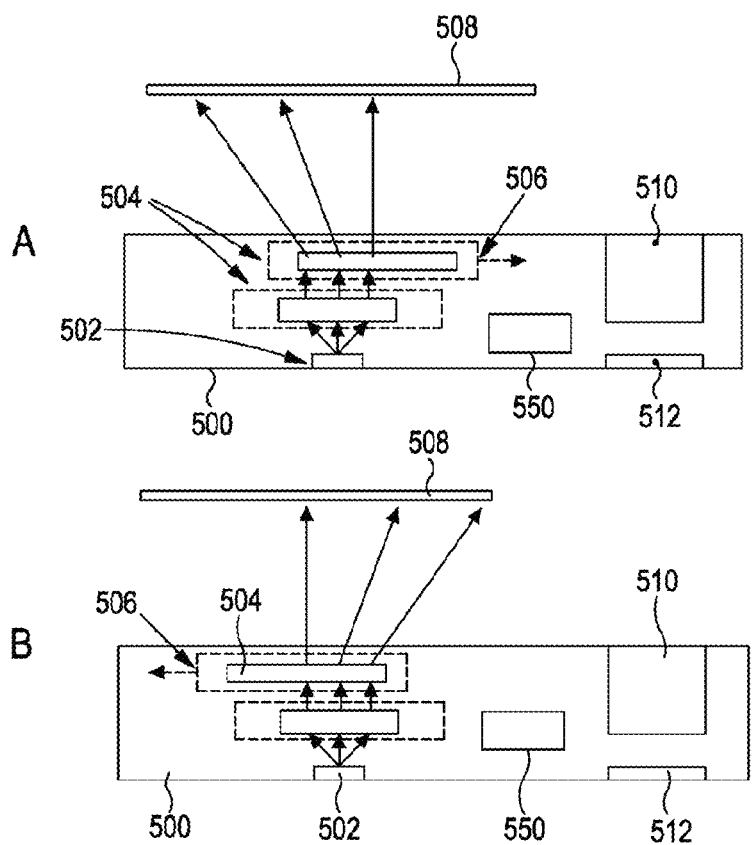
FIG. 1B is a schematic diagram of a TOF system that emits illumination in multiple configurations with each configuration having a different spatially-varying intensity over a field of view of an image sensor. The system is shown producing a first configuration (A) and a second configuration (B) of illumination.
Figure 2:
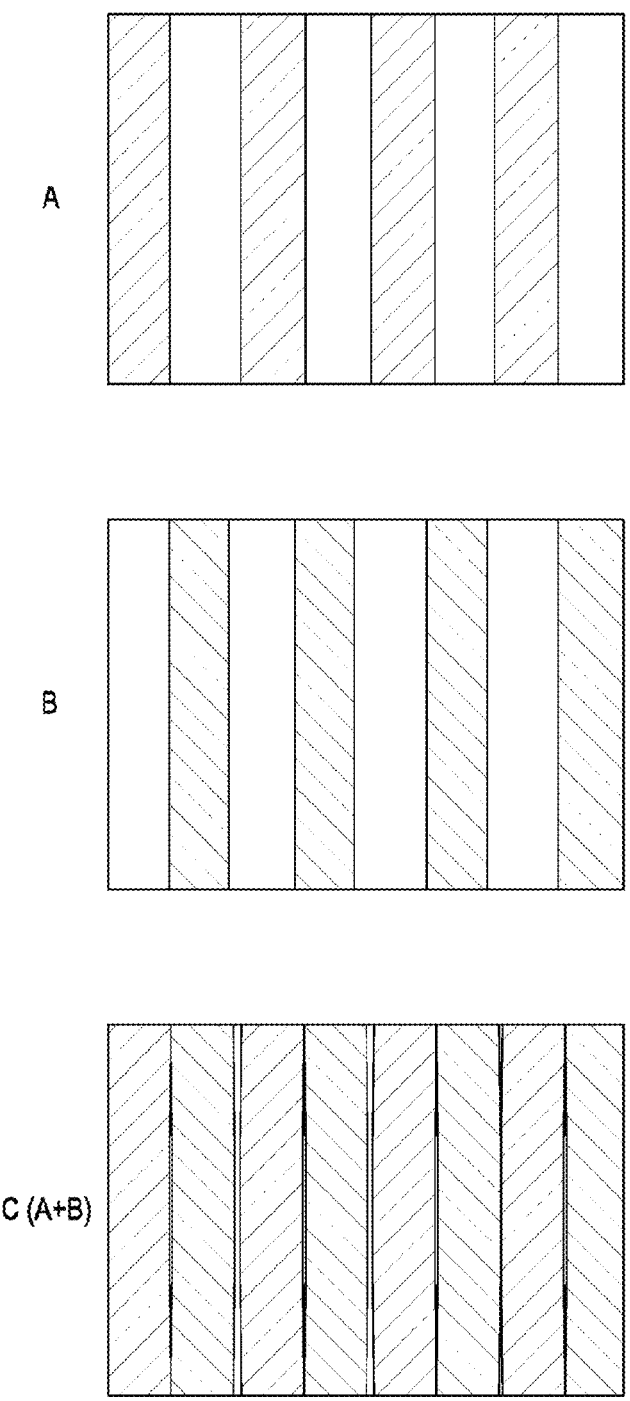
FIG. 2 illustrates a first configuration (A) and a second configuration (B) of illumination produced by the system of FIG. 1 as well as a sum of the illumination of the first and second configurations C=(A+B).
Figure 3:
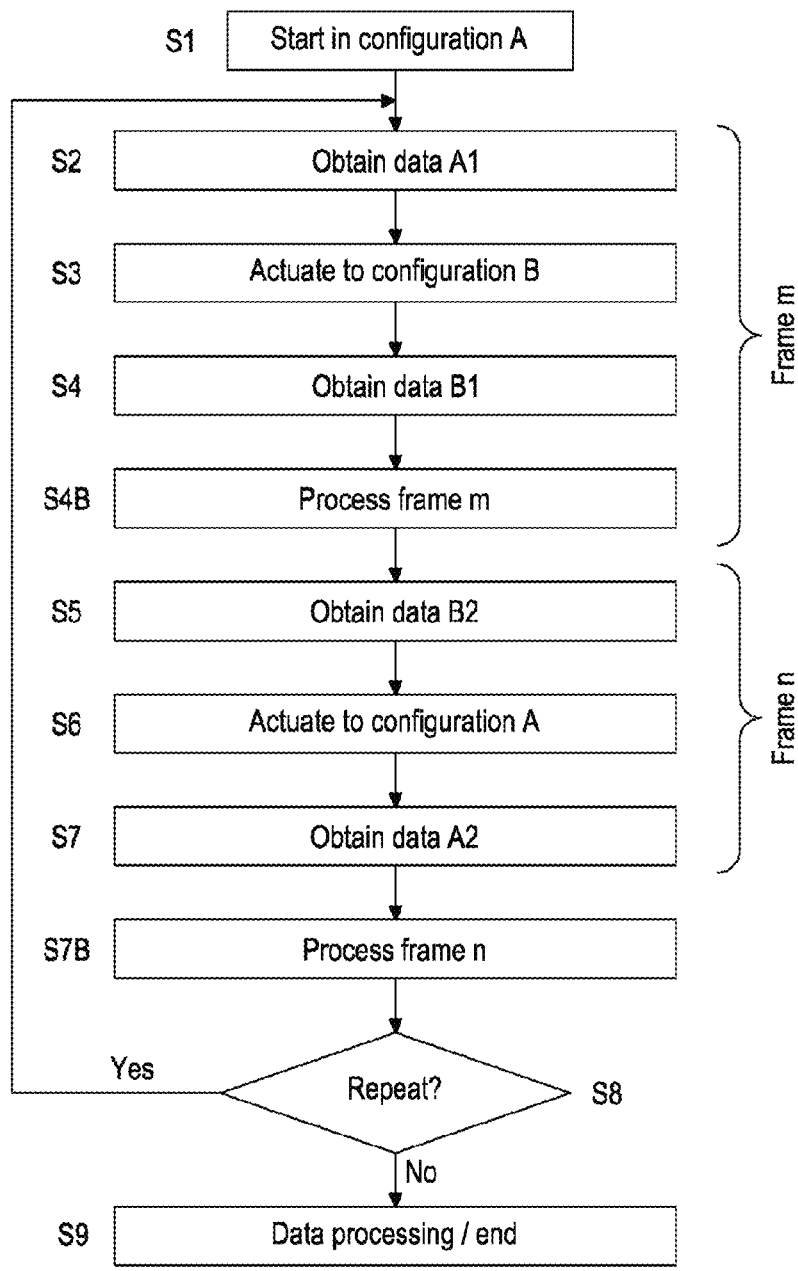
FIG. 3 illustrates a method of which may be carried out by the system of FIG. 1B.

Referring to FIGS. 1 to 3, an example of a TOF system 500 will now be described.

FIG. 1A illustrates an SMA actuator arrangement 506 as implemented in the time-of-flight sensor system. The actuator arrangement 506 comprises a total of four SMA actuator wires 11, 12, 13, 14 connected between a support block 16 that forms part of a support structure and is mounted to a base and a moveable element 15.

Each of the SMA actuator wires 11 to 14 is held in tension, thereby applying a force between the moveable element 15 and the support block 16 in a direction perpendicular to a notional primary axis, here referred to as an optical axis. In operation, the SMA actuator wires 11 to 14 move the moveable element 15 relative to the support block 16 in two orthogonal directions perpendicular to the optical axis.

The SMA actuator wires 11 to 14 are connected at one end to the moveable element 15 by respective crimping members 17 and at the other end to the support block by crimping members 18. The crimping members 17, 18 crimp the wire to hold it mechanically, optionally strengthened by use of an adhesive. The crimping members 17, 18 also provide an electrical connection to the SMA actuator wires 11 to 14. However, it will be understood that any suitable means for connecting the SMA actuator wires 11 to 14 may alternatively be used.

The four SMA wires 11 to 14 are arranged in a loop around the optical axis. The four SMA wires consist of a first pair of SMA wires 11, 13 arranged on opposite sides of the optical axis and a second pair of SMA wires 12, 14 arranged on opposite sides of the optical axis. The first pair of SMA wires 11, 13 are capable of selective driving to move the moveable element 15 relative to the support structure in a first direction, and the second pair of SMA wires 12, 14 are capable of selective driving to move the moveable element 15 relative to the support structure in a second direction transverse to the first direction. Movement in directions other than parallel to the SMA wires 11 to 14 are driven by a combination of actuation of these pairs of SMA wires to provide a linear combination of movement of the moveable element in the transverse directions. Another way to view this movement is that simultaneous contraction of any pair of the SMA wires that are adjacent to each other in the loop will drive movement of the moveable element in a direction bisecting those two of the SMA wires (i.e. producing diagonal movement).

As a result, the SMA wires 11 to 14 may be capable of being selectively driven to move the moveable element 15 relative to the support structure to any position in a range of movement in two orthogonal directions perpendicular to the optical axis. The magnitude of the range of movement depends on the geometry and the range of contraction of the SMA wires within their normal operating parameters.

Referring particularly to FIG. 1B, the TOF system 500 includes an illuminating part which comprises a light source 502 and a set of optical elements 504.

The light source 502 may be a vertical cavity surface emitting Laser (VCSEL) array or another type of laser light source or another type of light source (such as an LED light source).

The light emitted by the light source 502 passes through a set of one or more optical elements 504 before being emitted from the TOF system 500.

The set of optical elements 504 may include one or more lens elements for collimation of the light, one or more diffractive optical elements for optical field control, one or more lenses for directing the light, and/or one or more other types of optical elements, e.g. prisms, mirrors, etc.

The SMA actuation mechanism 506 is operatively connected to, and is configured to move, one or more of the set of optical elements 504.

Hence the TOF system 500 is capable of emitting illumination in multiple configurations with each configuration having a different spatially-varying intensity over a field of view of an image sensor.

In the illustrated example, the set of optical elements 504 includes a diffractive optical element to produce an optical field which is described in more detail below. The set of optical elements 504 also includes a lens (hereinafter referred to as a shift lens) to which the actuation mechanism 506 is operatively connected. Translational movement of the shift lens 310 in directions perpendicular to the optical axis result in steering of the light. In FIG. 1A, the light is steered towards the left and, in FIG. 1B, the light is steered towards the right. The actuation mechanism 506 as described in WO 2013/175197 A1 is incorporated herein by this reference.

The TOF system 500 further includes an imaging part which includes a receiver lens and/or filter system 510, and an image sensor (also known as a multipixel sensor) 512 for sensing light reflected from the scene.

Referring particularly to FIG. 2, the TOF system 500 is configured to emit two different configurations of illumination (hereinafter sometimes referred to as configurations A and B). In each configuration, the illumination is largely concentrated in a series of stripes that together fill ~50% of the field of view of the image sensor 512, with the illumination in configuration A not substantially overlapping with the illumination in configuration B. Hence, as illustrated in the lower panel of the drawing, the sum of the illumination of configurations A and B is substantially uniform over the field of view of the image sensor 512. In some other embodiments, there may be overlap between the illumination in configurations A and B. For example, in each configuration, the illumination may be largely concentrated in a series of stripes that together fill more than 50% of the field of view of the image sensor, with the illumination in configuration A overlapping with the illumination in configuration B.

The striped optical field is produced by the above-described diffractive optical element. In configuration A, the stripes are located towards the left of the field of view and, in configuration B, the stripes are located towards the right of the field of view. The movement between the two configurations is produced by the actuation mechanism 506 translationally moving the shift lens 310 as described above. The shift lens 310 may move by a distance of the order of ~100 µm.

Referring particularly to FIG. 1, the TOF system 500 also includes a controller 550 which is operatively connected to the actuation mechanism 506 and to the image sensor 512. The controller 550 is configured to cause the other parts of the TOF system 500 to operate as described herein.

Referring particularly to FIG. 3, a set of operations carried out by the TOF system 500 will now be described.

At a first step S1, the TOF system 500 is arranged to emit illumination in configuration A (cf. FIGS. 1A and 2A).

At a second step S2, the TOF system 500 obtains a set of data (hereinafter referred to as 'data A1') from the image sensor 512. This step per se may be carried out in a conventional way for TOF systems 500. Relatively high resolution and/or range depth data may be obtained for the illuminated regions (stripes) of configuration A.

At a third step S3, the actuation mechanism 506 moves the shift lens such that the TOF system 500 emits illumination in configuration B (cf. FIGS. 1B and 2B).

At a fourth step S4, the TOF system 500 obtains a set of data (hereinafter referred to as 'data B1') from the image sensor 512 and subsequently processes the set of data for frame m at step S4B. Again, this step per se may be carried out in a conventional way for TOF systems 500, and relatively high resolution and/or range depth data may be obtained for the illuminated regions (stripes) of configuration B.

At a fifth step S5, the TOF system 500 obtains a set of data (hereinafter referred to as 'data B2') from the image sensor 512. This step is similar to the previous step S4.

At a sixth step S6, the actuation mechanism 506 moves the shift lens such that the TOF system 500 again emits illumination in configuration A.

At a seventh step S7, the TOF system 500 obtains a set of data (hereinafter referred to as 'data A2') from the image sensor 512 and subsequently processes the set of data for frame n at step S7B. This step is similar to the second step S2.

The eighth step S8 illustrates that the above-described steps S2-S7 may or may not be repeated any number of times.

The eight step S9 illustrates that the TOF system 500 processes the data obtained at the above-described steps. This may be done after the above-described steps, as illustrated, or during these steps. The data obtained, i.e. data A1, data A2, data B1, data B2 can be used to produce two depth (or range) image frames (Frames m and n). In particular, data A1 and data B1 can be combined ('fused') to produce a first depth image that covers substantially all of the field of view of the image sensor 512. Furthermore, data A2 and data B2 can be combined to produce a second depth image that covers substantially all of the field of view of the image sensor 512 (cf. FIG. 2C).

The actuation mechanism 506 was not used before obtaining data A1 (and the same applies when steps S2-S7 are repeated) and was not used before obtaining data B2. In other words, by adopting a sequence of configurations like A-B-B-A etc., the frequency with which the actuation mechanism 506 moves has been halved, compared e.g. to a sequence like A-B-A-B etc. In other words, the requirement of actuator bandwidth has been halved whilst ensuring that there is always an adjacent A-B pair to perform depth fusion, therefore maintaining 30 fps of depth map information.

As mentioned above, ~100 μm of movement is required to move between the two configurations, and the typical cycling rate (60 Hz) of the TOF imaging system 500 is considerably above the thermal bandwidth of the wire (7 Hz).

Changing the sampling order to the one described above allows composite frames to be emitted at 30 frames per second [as adjacent 33 ms blocks contain an A and B frame]. However, it halves the number of transitions required and more than doubles the amount of cool-down time available between transitions for a particular SMA actuator wire. This mitigates against the risk to the SMA actuator due to thermal soak, i.e. heat accumulating from repetitive activations without sufficient time to dissipate that heat between cycles.

The techniques described above are particularly applicable to SMA actuator technology as they have an asymmetry in heating and cooling response, meaning that is desirable to carry out a relatively fast movement (~5 ms) once every e.g. 60 ms than once every e.g. 30 ms.

It will be appreciated that there may be many other variations of the above-described embodiments.

For example, the illumination patterns may be different (e.g. checkerboard), may have a different fill factor, and/or more than two different configurations (e.g. A, B, C) in which case the sequence may correspond to A-B-C-C-B-A etc.

Figure 4A:
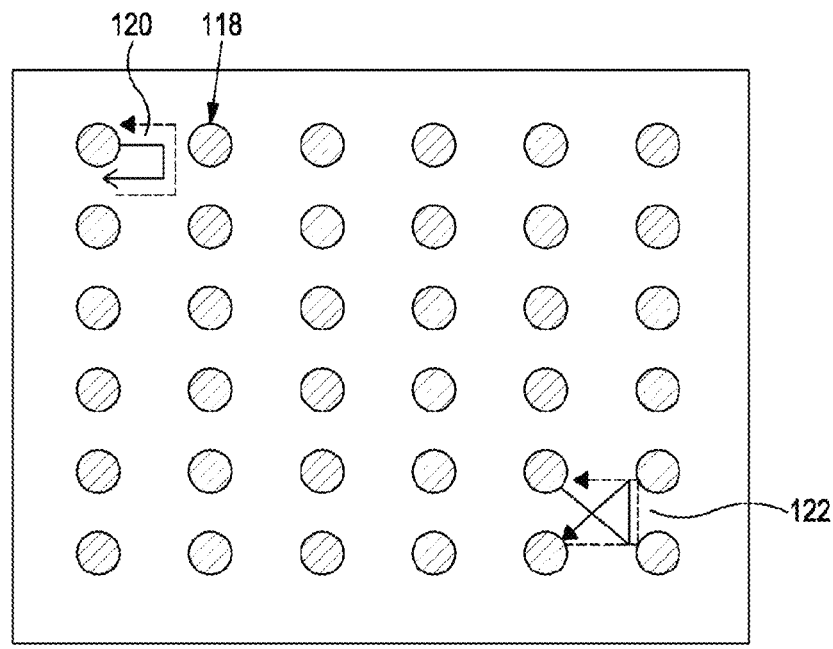
FIG. 4A illustrates an illumination pattern of a second embodiment according to the present invention.
Figure 4B:
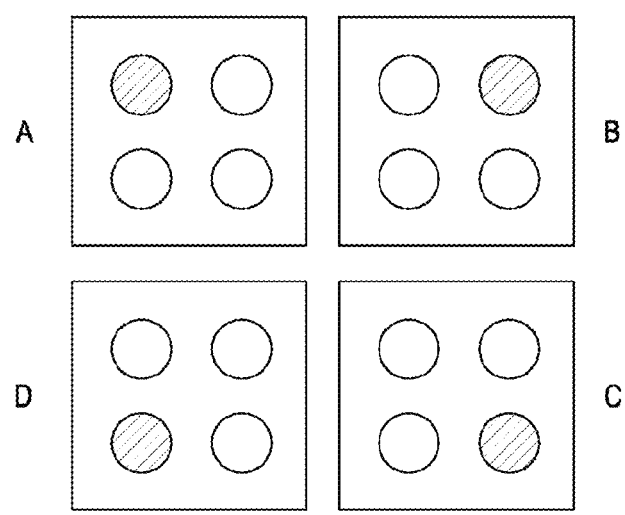
FIG. 4B illustrates a first configuration (A) and a final configuration (D), and intermediate configurations (B, C) of illumination produced by the system of FIG. 1.

FIG. 4A illustrates an illumination pattern of a second embodiment according to the present invention. FIG. 4B illustrates a first configuration (A) and a final configuration (D), and intermediate configurations (B, C) of illumination produced by the system of FIG. 1.

In this embodiment, the illumination takes the form of a pattern of dots of light evenly distributed across the field of view. Thus, the illumination may be referred to as spot illumination. However, it will be understood that any beam shape may be used, as described above. The spatially non-uniform intensity of the spot illumination corresponds to a set of regions 118 in which the peak emitted intensity is substantially constant. In this example, the set of regions 118 together cover between 40% and 50% of the sensor surface at any given time. The ratio of intensity of illumination at the dots of light to the intensity of illumination between the dots of light is greater than 30, and may depend on the ambient/background noise.

The TOF system 500 is configured to move the spot illumination across at least part of the field of view to generate an output frame. The movement of the spot illumination is caused by the SMA actuator 506. The SMA actuator moves the spot illumination in a scanning pattern across the field of view. In this example, the scanning pattern 120 comprises a first sequence including: obtaining a data set for configuration A, moving the spot illumination in a first direction to switch the illumination from the first configuration A to a first intermediate configuration B, moving the spot illumination in a second direction to switch the illumination from the first intermediate configuration B to a second intermediate configuration C, moving the spot illumination in a third direction to switch the illumination from the second intermediate configuration C to a final configuration D. The first and third directions are parallel and are perpendicular to the second direction. A dataset is obtained at each configuration after each movement.

The scanning pattern 120 further comprises a second sequence, wherein the data set for the illumination final configuration D is obtained before moving the spot illumination in the first direction to switch the illumination from the final configuration D to the second intermediate configuration C. The second sequence further comprises: moving the spot illumination in a fourth direction to switch the illumination from the second intermediate configuration C to the first intermediate configuration B, moving the spot illumination in the third direction to switch the illumination from the first intermediate configuration B to return to the first configuration A. The first and third directions are perpendicular to the fourth direction. A dataset is obtained at each configuration C, B, A after each movement.

Therefore, in repeated cycles, two data sets are consecutively obtained at each of the first and final configurations A, D, without moving the illumination in between the sequences. Thus, the sequence corresponds to A-B-C-D-D-C-B-A . . . A-B-C-D-D-C-B-A.

As illustrated, the order of the configuration A-D in the second sequence of the scanning pattern 120 is reversed from the first sequence. However, in other embodiments, such a reverse order may not be necessary. This may be better illustrated by an example scanning pattern 122 as shown in FIG. 4A.

In scanning pattern 122, an alternative first sequence comprises moving the spot illumination diagonally to switch the illumination from the first configuration A directly to the second intermediate configuration C, moving the spot illumination in the fourth direction to switch the illumination from the second intermediate configuration C direction to the first intermediate configuration C, and moving the spot illumination diagonally to switch the illumination diagonally from the first intermediate configuration B directly to the final configuration D. Thus, the resulting sequence corresponds to A-C-B-D-D-C-B-A . . . A-C-B-D-D-C-B-A.

The set of regions 118 are arranged such that the movement of the spot illumination causes the set of regions 118 to cover more than 90% of the field of view during a cycle of the scanning pattern. The set of regions a18 are also arranged such that the movement of the spot illumination substantially avoids regions of the set of regions 118 covering the same part of the sensor surface more than once during a cycle of the scanning pattern.

Figure 4C:
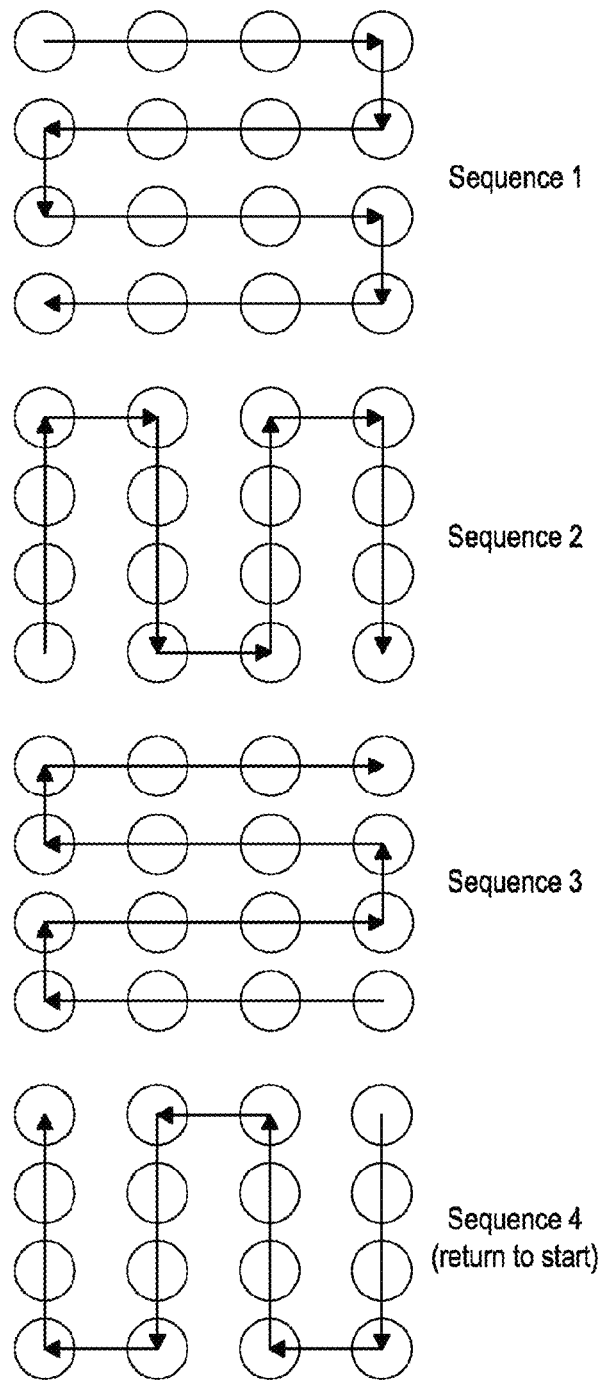
FIG. 4C illustrates an example scanning pattern for a scanning region according to the present invention.

As the size of scanning region 118 increases, the variations in the scanning pattern may accordingly increase. FIG. 4C illustrates an example scanning pattern 124 for a scanning region 118 having 4×4 scanning spots. In sequence 1, the spot illumination progressively scans, row by row, the scanning region 118. Once the data set for the last configuration in sequence 1 (bottom left spot as shown in FIG. 4C) is obtained, the spot illumination progress onto sequence 2, where a data set of its first configuration (bottom left spot as shown in FIG. 4C) is again obtained before moving the spot illumination to scan, column by column, the rest of scanning region 118. Similarly, two data sets for bottom right spot (as shown in FIG. 4C) are consecutively obtained from last configuration of sequence 2 and first configuration of sequence 3, without moving the spot illumination in between. Likewise, two data sets for top right spot (as shown in FIG. 4C) are consecutively obtained from last configuration of sequence 3 and first configuration of sequence 4, without moving the spot illumination in between. Finally, the spot illumination scans by sequence 4, column by column, the scanning region 118 and returns to the final configuration top left spot (as shown in FIG. 4C). Thereafter, the scanning cycle may repeat by starting sequence 1, where a data set for the first configuration (top left spot as shown in FIG. 4C) is obtained without moving the spot illumination.

Therefore, the example scanning pattern as shown in FIG. 4C comprises four sequence each having different scanning pattern over the scanning region 118, and two data sets for each spot are obtained.

The TOF system 500 may be adapted to suit different applications. For example, in some other embodiments, the illumination may be substantially uniform throughout substantially all of the field of view of the camera (i.e. correspond to flood illumination), while, in at least one other configuration, the illumination may be non-uniform, e.g. patterned as described above or in some other way. This may be achieved with different movements of one or more of the set of the optical elements 504 to those described above.

Figure 5A:
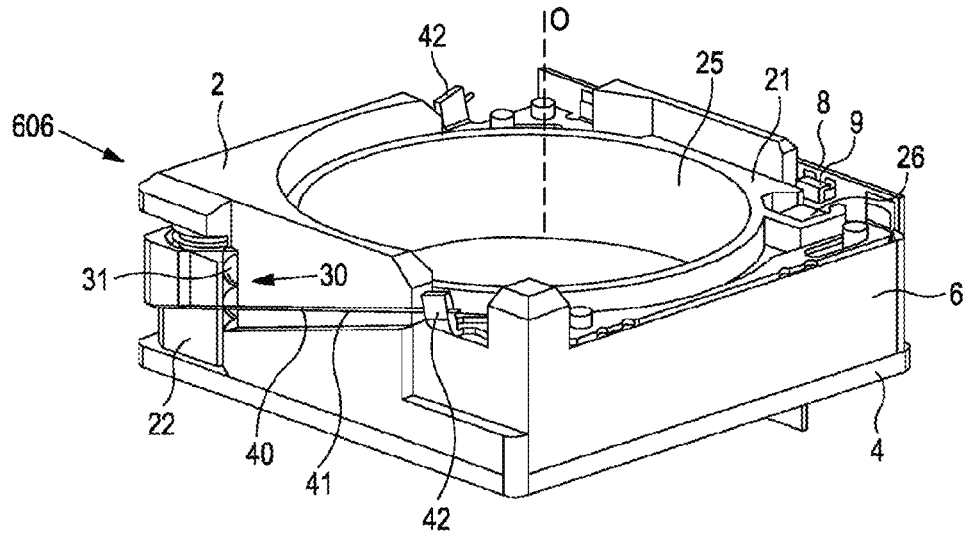
FIG. 5A is a perspective view of an SMA actuator of a second embodiment according to the present invention.

FIG. 5A shows an SMA actuator 606 for used in tandem, or separate to, the SMA actuator 506 in the TOF system 500 of FIG. 1. The SMA actuator 606 is configured to drive movement in the lens 504 along its optical axis to effect focusing/defocusing of the illumination. The actuation mechanism 606 as described in GB 2569668 B is incorporated herein by this reference.

As shown in FIG. 5A, the SMA actuator 606 comprises a suspension system 30 that supports the lens 504 on a support structure 2. The suspension system 30 is configured to guide movement of the lens 504 with respect to the support structure 2 along the optical axis O which is therefore the movement direction in this example, while constraining movement of the lens 504 with respect to the support structure 2 in other degrees of freedom.

The SMA actuator 606 also comprises two lengths of SMA actuator wire 40 that are arranged as follows to drive movement of the lens 504 along the optical axis O. The two lengths of SMA actuator wire 40 are portions of a piece of SMA actuator wire 41 that is connected to the support structure 2 at each end by crimp portions 42 fixed at the top of the support structure on opposite corners. The piece of SMA actuator wire 41 is also connected to the lens element 20 by being hooked around protrusion 22. As a result, each of the lengths of SMA actuator wire 40 is connected at one end to the support structure 2 and at the other end to the lens element 20.

The lengths of SMA actuator wire 40 have an angle therebetween of 90 degrees as viewed along the optical axis O which is the movement direction in this example. More generally, the orientation of the lengths of SMA actuator wire 40 could be changed so that the angle therebetween as viewed along the optical axis O has any size less than 180 degrees, preferably in the range from 70 to 110 degrees.

The lengths of SMA actuator wire 40 drive movement of the lens 504 along the optical axis O on application of drive signals that cause heating and cooling of the lengths of SMA actuator wire 40. The lengths of SMA actuator wire 40 are resistively heated by the drive signals and cool by thermal conduction to the surroundings when the power of the drive signals is reduced. The lengths of SMA actuator wire 40 contract on heating driving movement of the lens 504 along the optical axis O in an upward direction (in FIG. 5A). Another set of SMA actuator wire 40 may be provided in an inverted configuration to drive movement of the lens 504 along the optical axis I in a downward direction. Or, alternatively, such downward movement may be provided by a biasing element such as a flexure.

Figure 5B:
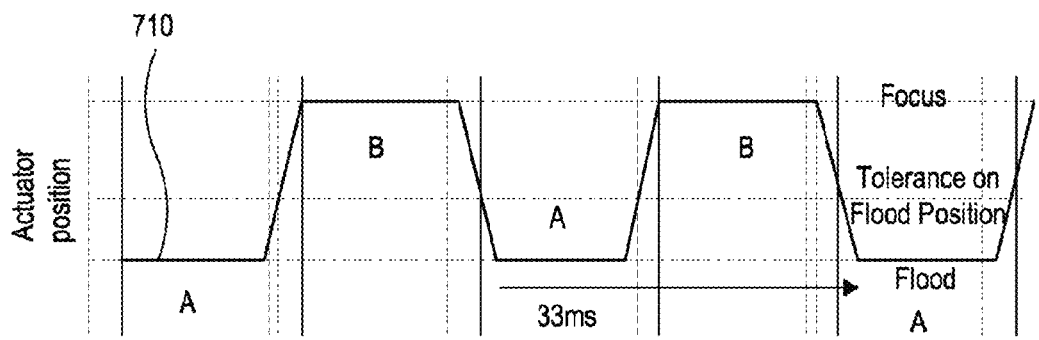
FIGS. 5B and 5C respectively illustrates movement of a lens of a prior art TOF system and a TOF system of the second embodiment.
Figure 5C:
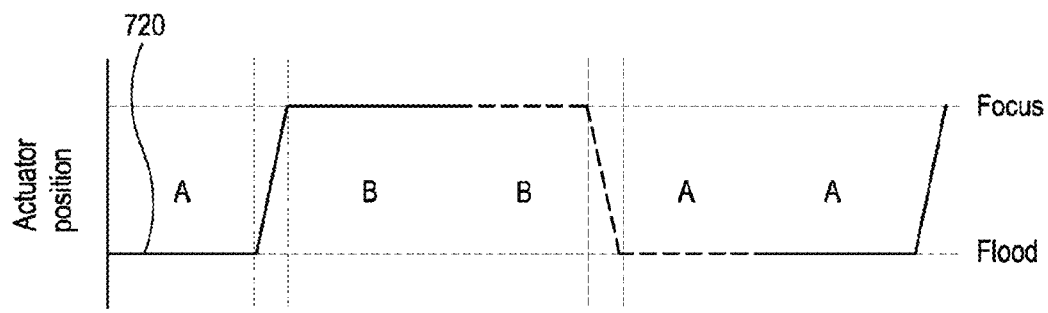
Figure 5D:
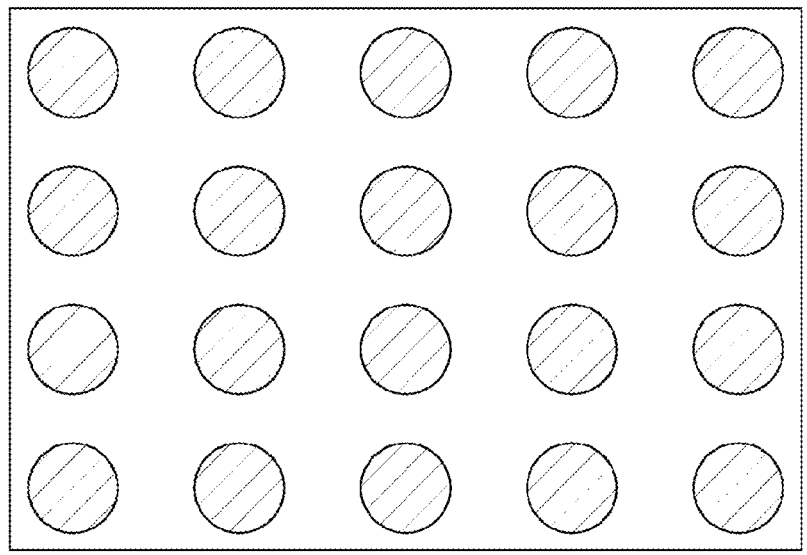
FIGS. 5D and 5E respectively illustrates the illumination pattern for non-uniform (spot) illumination and uniform (flood) illumination.
Figure 5E:
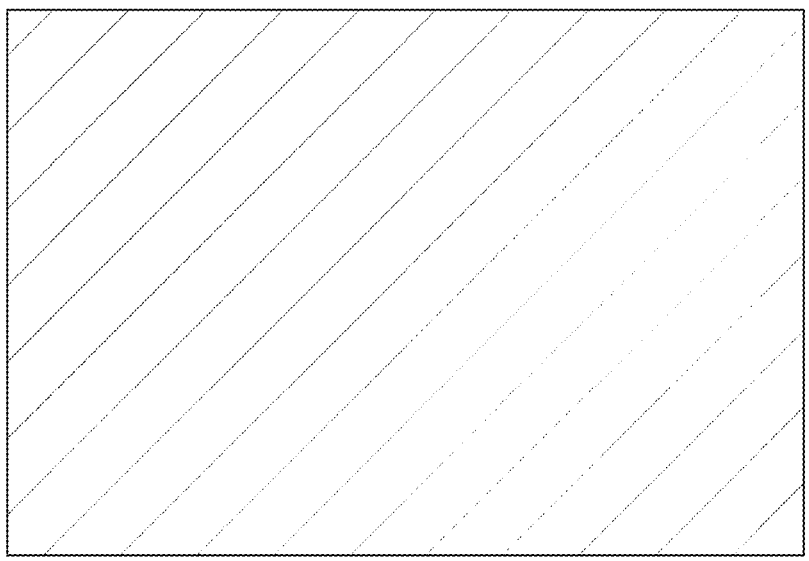

FIGS. 5B and 5C respectively illustrates movement of a lens of a known TOF system and a TOF system of the second embodiment. FIGS. 5D and 5E respectively illustrates the illumination pattern for non-uniform (spot) illumination and uniform (flood) illumination.

Spot (focussed or spatially non-uniform) illumination, as shown in FIG. 5D, is achieved by controlling the actuator to move the lens 504 to focus the illumination source on to a projected surface in the field of view. In spot illumination, one or more discrete illuminated spots can be observed.

In contrast, flood (defocussed or spatially uniform) illumination, as shown in FIG. 5E, is achieved by the controller controlling the actuator to move the lens 504 to defocus the illumination source on the projection surface. In spot illumination, the illumination is uniform across the field of view. The uniform illumination may be within the bound of the field of view, or it may extend beyond the bound of the field of view, e.g. the illumination may project onto a surface that is not captured by the camera.

In the known TOF system as shown in FIG. 5B, the graph 710 illustrates the actuator movement between flood and spot positions. That is, the sequence starts with obtaining a data set of the illumination of a first configuration A, and subsequently moving the illumination to the final configuration B to obtain another data set. Thereafter, the illumination is moved back to the first configuration A to start another sequence. Thus, the sequence of such known method corresponds to A-B-A-B.

In focussing SMA actuators such as actuator 606, it takes a finite time to move the lens 504 between flood and spot positions. In addition, there are decaying oscillations of the actuator position over time around the target position. Notably, the amplitude and decay time of the decaying oscillations is larger around the flood position than at the spot position. Either way, the switching between flood and spot illumination should be minimised.

FIG. 5C illustrates, in graph 720, improved movement of illumination offered by the TOF system 500, wherein the first sequence and second sequence are respectively presented by a solid line and a dotted line. Similar to the known TOF system of FIG. 5B, the sequence starts with obtaining a data set of the illumination of a first configuration A, and subsequently moving the illumination to the final configuration B to obtain another data set. However, in this embodiment, the illumination does not immediately move back to the first configuration A to start another first sequence. Instead, in the second sequence, the illustration stays at the final configuration B to obtain yet another data set before returning to the first configuration A. Thus, two data sets are consecutively obtained at each first and final configuration before the illumination is moved. Thus, the first and second sequences of the present method corresponds to A-B-B-A . . . A-B-B-A.

There may be further configurations C, D in between the first configuration A and the final configuration B for different levels of focussing, whereby the configurations in second sequence may or may not be in a reserve order to the first sequence. Thus, such sequence may correspond to A-C-D-B-B-D-C-A . . . A-C-D-B-B-D-C-A, etc.

For more numerous and more complex configurations of illumination, the optimum sequence corresponds to a solution of a 'travelling salesman'-type problem (TSP) with no requirement for the first and final destination (configuration) to be the same. So long as all points are visited, then the outbound tour (sequence) can be reversed to generate two sequences which include all the required data whilst giving minimum requirement for movement. Where SMA actuators are used, it may be the 'bottleneck traveling salesman problem' which is most appropriate, i.e. finding a tour where all edges are less than or equal to x (where x is typically either a distance or time for transition of the actuation mechanism).

The invention claimed is:

1. A method suitable for use by a time-of-flight (TOF) imaging system, wherein the system emits illumination in multiple configurations, each configuration having a different spatially-varying intensity over a field of view of an image sensor, the method comprising:
    moving an actuation mechanism to change the illumination via a first sequence of configurations from a first configuration to a final configuration;
    moving the actuation mechanism to subsequently change the illumination via a second sequence of configurations from the final configuration to the first configuration or a second configuration; and
    obtaining a set of data from the image sensor for each of the configurations in the first and second sequences, thereby obtaining two sets of data for each configuration that are suitable for producing two depth image frames, wherein the two sets of data corresponding to the final configuration are consecutively obtained from the first and second sequences.

2. The method according to claim 1, wherein the two sets of data consecutively obtained for the final configuration are obtained without moving the actuation mechanism.

3. The method according to claim 1, wherein the integrated intensity of the illumination during the first sequence is substantially the same as that during the second sequence.

4. The method according to claim 1, wherein the first and second sequence comprise equal number of configurations and optionally wherein the second sequence corresponds to the first sequence in reverse order.

5. The method according to claim 1, wherein each of the first and second sequences includes only the first configuration and the final configuration.

6. The method according to claim 1, wherein the first and second sequences each comprise one or more further configurations in between the first and final configurations in the respective sequence.

7. The method according to claim 1, wherein the intensity of the illumination integrated over each sequence is substantially uniform throughout substantially all of the field of view of the image sensor.

8. The method according to claim 1, wherein, for each sequence, the illumination in each configuration of the sequence is substantially non-overlapping with the illumination in any of the other configurations in the sequence.

9. The method according to claim 1, wherein each sequence includes at least one configuration in which the illumination is substantially non-uniform over at least a portion of the field of view of the image sensor.

10. The method according to claim 1, wherein each sequence includes at least one configuration in which the illumination is substantially uniform throughout substantially all of the field of view of the image sensor, and wherein the method further comprises moving the actuation mechanism to focus and de-focus the illumination, so as to switch between uniform illumination and non-uniform illumination.

11. The method according to claim 1, wherein the field of view of the image sensor corresponds to the field of view of the image sensor together with one or more optical elements associated with the image sensor.

12. The method according to claim 1, carried out in a series of subframes, wherein a set of data is obtained and then the actuation mechanism is moved during each subframe except for the final subframe associated with each sequence.

13. The method according to claim 1, wherein the actuation mechanism is moved within a first part of each subframe in which it is moved and the data is obtained within a second part of each subframe, wherein, in each final subframe, the data is obtained within substantially all of the subframe, and wherein the subframes have a frequency of between 40 and 80 Hertz.

14. The method according to claim 13, wherein the actuation mechanism is moved with a frequency of between 20 and 40 Hertz.

15. The method according to claim 13, wherein each first part has a first duration and each second part has a second duration that is longer than the first duration, optionally wherein the first duration is less than 10 milliseconds.

16. The method according to claim 1, wherein the actuation mechanism comprises one or more shape-memory alloy components that are resistively heated to provide the movement.

17. The method according to claim 16, wherein the one or more shape-memory alloy components are resistively heated within each first part and cool within each second part such that an average temperature of the one or more shape-memory alloy components does not substantially increase between successive subframes.

18. The method according to claim 1, wherein the sets of data obtained for each configuration include a set of data for the first configuration that is obtained without moving the actuation mechanism therebefore.

19. The method according to claim 1, wherein each change in illumination comprises moving the illumination in a scanning pattern across the field of view, optionally wherein the scanning pattern comprises moving the illumination in at least two non-parallel directions across the field of view in each of the first and second sequence.

20. The method according to claim 1, wherein the illumination comprises a light beam having a beam projection configured to tessellate, a light beam having a circular or polygonal beam projection, a pattern of parallel stripes of light, or a pattern of dots or circles of light.

21. The method according to claim 1, further comprising plural scanning cycles, wherein each of the plural scanning cycles having substantially the same first configuration and final configuration with the same, or different, first and second sequences of configurations.

22. The method according to claim 1, wherein the second sequence is from the final configuration to the second configuration and the method further comprises:
    moving the actuation mechanism to subsequently change the illumination via a third sequence of configurations from the second configuration to the final configuration or to a third configuration; and
    obtaining a set of data from the image sensor for each of the configurations in the third sequence,
    wherein the two sets of data corresponding to the second configuration are obtained without moving the actuation mechanism.

23. The method according to claim 22, wherein the third sequence is from the second configuration to the third configuration and the method further comprises:
    moving the actuation mechanism to subsequently change the illumination via a fourth sequence of configurations from the third configuration to the final configuration; and
    obtaining a set of data from the image sensor for each of the configurations in the fourth sequence, wherein the two sets of data corresponding to the third configuration are obtained without moving the actuation mechanism.

24. A non-transitory computer readable medium for causing a time-of-flight imaging system to perform a method according to claim 1.

25. An apparatus for use in a time-of-flight imaging system, the apparatus configured to perform a method according to claim 1.

26. The apparatus according to claim 25, further comprising:
    an illuminating part for emitting the illumination;
    the actuation mechanism, wherein the actuation mechanism is comprised in, or operatively connected to, the illuminating part;
    an imaging part comprising the image sensor; and
    at least one controller operatively connected to at least the actuation mechanism and the imaging part and configured to perform the method, wherein the actuation mechanism comprises one or more shape-memory alloy components.

* * * * *